United States Patent [19]

Dotson et al.

[11] Patent Number: 4,465,568
[45] Date of Patent: Aug. 14, 1984

[54] ELECTROCHEMICAL PRODUCTION OF $KNO_3/NaNO_3$ SALT MIXTURE

[75] Inventors: Ronald L. Dotson; Ronald C. Miles; Larry D. Carpenter, all of Cleveland, Tenn.

[73] Assignee: Olin Corporation, New Haven, Conn.

[21] Appl. No.: 322,000

[22] Filed: Nov. 16, 1981

[51] Int. Cl.³ .............................................. C25G 1/34
[52] U.S. Cl. ................................... 204/98; 204/128; 204/296; 423/395; 423/194; 423/202; 423/164
[58] Field of Search ............... 423/395, 194, 164, 202; 204/98, 128, 296

[56] References Cited

U.S. PATENT DOCUMENTS

| | | | |
|---|---|---|---|
| 2,715,608 | 8/1955 | Casciani et al. | 204/98 |
| 4,021,327 | 5/1977 | Grot | 204/98 |
| 4,030,988 | 6/1977 | Grot | 204/98 |
| 4,036,714 | 7/1977 | Spitzer | 204/98 |
| 4,062,743 | 12/1977 | Ahn et al. | 204/98 |
| 4,065,366 | 12/1977 | Oda et al. | 204/98 |
| 4,080,270 | 3/1978 | O'Leary et al. | 204/87 |
| 4,085,071 | 4/1978 | Resnick et al. | 204/98 |
| 4,147,599 | 4/1979 | O'Leary et al. | 204/87 |
| 4,191,618 | 3/1980 | Coker et al. | 204/98 |
| 4,253,923 | 3/1981 | Lynch et al. | 204/98 |
| 4,358,545 | 11/1982 | Ezzell et al. | 204/98 |

OTHER PUBLICATIONS

"Heat Transfer Agents for High Temp. Systems" by J. R. Fried, Process Heat Exchange, Chem. Eng. Magazine, McGraw-Hill, 1979, pp. 492-493, 495.
Encyclopedia of Chemical Reactions, Rheinhold Publishing Co., 1956, p. 320.

Primary Examiner—R. L. Andrews
Attorney, Agent, or Firm—Arthur E. Oaks; Donald F. Clements

[57] ABSTRACT

A process for the electrolytic production of a chloride-free mixture consisting essentially of sodium and potassium nitrates is disclosed. In this process, an anolyte brine comprised of a mixture of sodium and potassium chlorides dissolved therein is electrolyzed in a membrane type electrolysis type cell to produce a mixed alkali metal hydroxide catholyte solution. The catholyte is reacted with nitric acid to form a mixed potassium-sodium nitrate solution. By properly adjusting the ratio of potassium chloride to sodium chloride concentration in the anolyte brine, a final nitrate product containing about from about 40% to about 80% $NaNO_3$ and from about 60% to about 20% $KNO_3$ by weight can be produced. The resulting product, after drying is suitable for use in many solar panel heat transfer applications.

48 Claims, 1 Drawing Figure

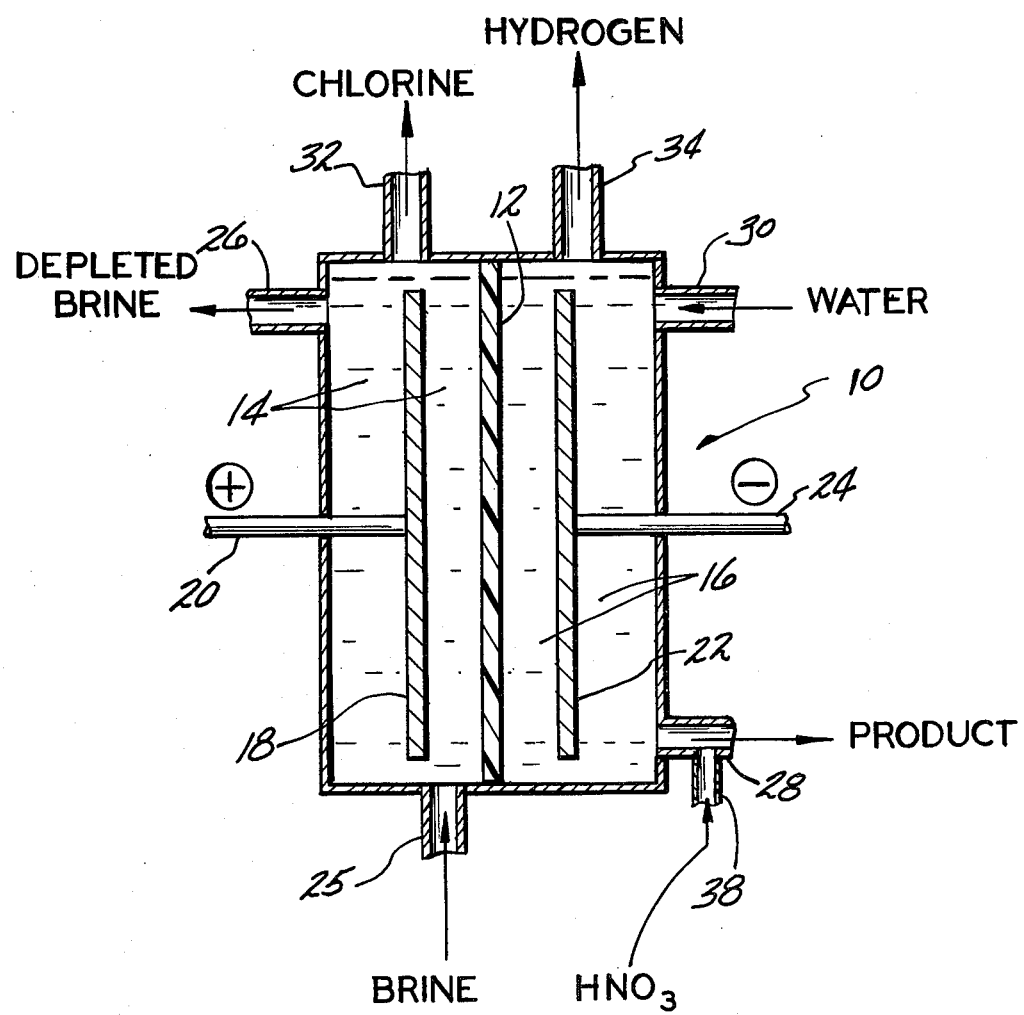

ELECTROCHEMICAL PRODUCTION OF KNO3/NANO3 SALT MIXTURE

BACKGROUND OF THE INVENTION

This invention relates generally to an electrolytic process for producing chloride free alkali metal nitrates. More particularly, it relates to a process for producing a mixture consisting essentially of sodium and potassium nitrates in a membrane cell employing particular permselective membranes and operating parameters.

Both sodium and potassium nitrates are used in a wide variety of industrial and agricultural uses. While the world needs for $NaNO_3$ are largely met from naturally occurring Chile saltpeter, there are few natural sources of $KNO_3$. As a result, the largest part of currently used $KNO_3$ is made synthetically by the reaction:

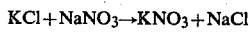

$$KCl + NaNO_3 \rightarrow KNO_3 + NaCl$$

usually starting from natural ores containing KCl (e.g. silvinite—NaCl.KCl or carnallite—$KCl.MgCl_2.6H_2O$) or $K_2SO_4$ (langbeinite—$K_2SO_4.2MgSO_4$ and kainite—$K_2SO_4.MgSO_4.3H_2O$). The processing operations employed, usually flotation, leaching, evaporation and crystallization, are primarily intended to separate reasonably pure potassium salts from the associated sodium or magnesium salts found in these ores. Where highly purified potassium salts are required, the processing, especially to remove any sodium present, can become quite elaborate. For example, U.S. Pat. No. 2,715,608, issued to Casciani and Lang on Aug. 16, 1955, teaches the electrolysis of a purified brine derived from sylvinite in a diaphragm cell of the type used in conventional chlor-alkali production to produce a mixed alkali metal hydroxide solution. When concentrated and cooled, potassium ions combine with the chloride ions normally present in the catholyte product to form a precipitate of very pure KCl. In this process, KCl is the primary product of interest with the caustic soda, chlorine and hydrogen normally produced being considered as by-products.

Most recently, it has been found that the eutectic of about 40 wt.% $KNO_3.60$ wt.% $NaNO_3$ offers a number of particular advantages for use as a heat transfer medium in solar power systems. However, because of the relatively high processing costs encountered in converting KCl to pure $KNO_3$, it has been impractical to produce large tonnages of reasonably pure mixed alkali metal nitrates. Thus, there is a need to be able to economically produce such a mixture starting from a natural sodium and potassium bearing ore such as sylvinite with a minimum of additional processing.

BRIEF DESCRIPTION OF THE INVENTION

It is the primary object of this invention to provide a combined electrolytic process for producing mixed alkali metal nitrates.

It is another object of the present invention to produce pure mixed alkali metal nitrates, essentially free of chloride contamination.

It is still another object to produce chloride-free mixed alkali metal nitrates having a weight ratio of sodium nitrate to potassium nitrate of about 60:40 in the finished product.

These and other objects of the invention will become apparent from the following description and the appended claims.

The aforementioned and other objects are achieved in a process for the preparation of mixed sodium and potassium nitrates in an electrolytic cell which comprises electrolyzing a brine of potassium chloride and sodium chloride in a cell having anolyte and catholyte compartments sealingly separated by a permselective cation exchange hydraulically impermeable membrane of particular composition and properties to produce a mixture consisting essentially of sodium and potassium hydroxides in the catholyte, reacting nitric acid with the catholyte to form a mixed alkali metal nitrate solution and recovering a solid mixture of potassium nitrate and sodium nitrate from said reacted solution.

DESCRIPTION OF THE DRAWING

FIG. 1 is a side cross-sectional view of an electrolytic cell that is used to produce alkali metal nitrates in accordance with the process of this invention.

DESCRIPTION OF THE PREFERRED EMBODIMENT

FIG. 1 illustrates a basic membrane cell 10, separated by a membrane 12 into an anode compartment 14 and a cathode compartment 16. In anode compartment 14, an anode 18 is shown mounted generally in a spaced apart relationship to membrane 12 and is connected to the positive terminal of an electrical supply source (not shown) by anode lead 20. Similarly, in cathode compartment 16, there is mounted a cathode 22 in a generally spaced apart relationship to membrane 12. The cathode 22 is connected to the negative terminal of an electrical supply source (not shown) by cathode lead 24. Mixed alkali metal chloride brine is charged to the anode compartment 14 through inlet 25 and depleted brine exits through outlet 26. The caustic catholyte solution is removed from the cathode compartment 16 through outlet 28 while water, if desired, is charged through inlet 30. Chlorine and hydrogen bases are discharged through outlet vents 32 and 34, respectively. The levels of solutions in both the cathode and anode compartments are adjusted to allow disengagement of the evolved gases from the anolyte and catholyte solutions prior to exiting the cell.

For the production of mixed nitrates nitric acid is preferably injected into the product outlet 28 through acid inlet 38 so that the neutralization reaction occurs outside of the cell. Injection of the acid as a part of the water charged through water inlet 30 is not generally recommended because the highly exothermic nature of the neutralization process combined with the practical difficulties of maintaining a high pH in catholyte chamber 16 have been shown to have very adverse effects both on the cell operating voltage, membrane life and the cathode.

Typical industrial electrochemical cells which may be adapted to the process of the subject invention are disclosed in U.S. Pat. No. 4,062,743 which issued Dec. 13, 1977 to Ahn et al., U.S. Pat. No. 4,233,122 which issued Nov. 11, 1980 to Lynch et al. and U.S. Pat. No. 4,253,923 which issued Mar. 3, 1981 to Lynch et al. all of which are hereby incorporated by reference in their entirety.

Anode 18 may be any conventional electrically conductive electrolytically active material resistant to the anolyte such as graphite or, preferably, a valve metal such as titanium, tantalum or alloys thereof bearing on its surface a noble metal, a noble metal oxide (either alone or in combination with a valve metal oxide) or other electrolytically active, corrosion resistant materials. Anodes of the preferred class are called dimensionally stable anodes and are well known and widely used in industry; see, for example, U.S. Pat. Nos. 3,117,023 3,632,498, 3,840,443 and 3,846,273. While solid anodes may be used, generally foraminous anodes such as expanded mesh sheet, are preferred since they have greater electrolytically active surface areas and facilitate the formation, flow and removal of chlorine gas from the anolyte compartment.

Cathode 22, similarly may be any conventional electrically conductive material resistant to the catholyte such as iron, mild steel, stainless steel, nickel and the like. Preferred, however, are cathodes containing surface layers of one form or another of Raney nickel or other catalytically active materials. Much work has been done to improve cell efficiency with such materials; see, for example, U.S. Pat. Nos. 4,240,895, 4,133,778, 4,076,611 and 4,080,278. As with anode 18, while solid cathodes may be used, generally foraminous (screen, expanded mesh, apertured and the like) materials are preferred to facilitate the generation, flow and removal of hydrogen gas from the cathode compartment.

The membrane used in the electrolytic cell in carrying out the process of this invention is a permselective cation exchange hydraulically impermeable membrane selected from one of several groups of materials. Suitable membranes in these groups include amine-substituted polymers, unmodified perfluorosulfonic acid laminates, homogeneous perfluorosulfonic acid laminates and carboxylic acid substituted polymers.

The first group of membranes includes amine substituted polymers such as diamine and polyamine substituted polymers of the type described in U.S. Pat. No. 4,030,988, issued on June 21, 1977 to Walther Gustav Grot and primary amine substituted polymers described in U.S. Pat. No. 4,085,071, issued on Apr. 18, 1978 to Paul Raphael Resnick et al. Both of the above patents are incorporated herein in their entirety by reference.

With reference to the diamine and polyamine substituted polymers of U.S. Pat. No. 4,030,988, supra, the basic precursor sulfonyl fluoride polymer of U.S. Pat. No. 4,036,714, issued on July 19, 1977 to Robert Spitzer, and incorporated herein in its entirety by reference, is first prepared and then reacted with a suitable diamine, such as ethylene diamine, or polyamine to a selected depth wherein the pendant sulfonyl fluoride groups react to form N-monosubstituted sulfonamido groups or salts thereof. The thickness of amine substituted polymers of the first group is in the range from about 4 to about 10 and preferably in the range from about 5 to about 8 mils.

The selected depth is typically in the range from about 1.0 to about 7.0 and preferably from about 1.2 to about 1.5 mils.

In preparing the basic precursor sulfonyl fluoride as described in the U.S. Pat. No. 4,036,714 above, the preferred copolymers utilized in the film are fluoropolymers or polyfluorocarbons although others can be utilized as long as there is a fluorine atom attached to the carbon atom which is attached to the sulfonyl group of the polymer. A preferred copolymer is a copolymer of tetrafluoroethylene and perfluoro (3,6-dioxa-4-methyl-7-octenesulfonyl fluoride) which comprises 10% to 60% and preferably 25% to 50% by weight of the latter. Surface sulfonyl groups are then converted to form diamine and octyamino groups or salts thereof through the reaction of the diamine, such as ethylene diamine.

With only surface conversion of the sulfonyl halide groups, further conversion of the remaining sulfonyl halide groups to the ionic form is most desirable. The prior art techniques of conversion of the —$SO_2X$ groups with X as chlorine or fluorine may be undertaken such as by hydrolysis. The techniques set forth in Connolly et al., U.S. Pat. No. 3,282,875 and/or Grot, U.S. Pat. No. 3,784,399 may be employed, Illustratively, the unconverted sulfonyl groups of the polymer may be converted to the form —$(-SO_2NH)_mQ$ wherein Q is H, $NH_4$, cation of an alkali metal and/or cation of an alkaline earth metal and m is the valence of Q. Preferred definitions of Q include $NH_4$, and particularly sodium or potassium. Additionally, the unconverted sulfonyl groups may be formed to —$(SO_3)_n$Me wherein Me is a cation and n is the valence of the cation. Preferred definitions of Me include potassium, sodium and hydrogen.

As employed in this disclosure, a di- or polyamine is defined as an amine which contains at least two amino groups with one primary amino group and the second amino group either primary or secondary. Additional amino groups may be present so long as the above-defined amino groups are present.

Specific amines falling within the above definition are included within the disclosure in U.S. Pat. No. 3,647,086, issued to Mizutani et al. on May 7, 1972, which disclosure of amines is incorporated by reference herein.

Typical membranes of the first group prepared from ethylene diamine which may be employed in the process of this invention include (a) a homogeneous film about 7 mils thick of about 1200 equivalent weight perfluorosulfonic acid resin which has been chemically modified by ethylene diamine converting a depth of about 1.5 mils to the perfluorosulfonamide, (b) a homogeneous film about 7 mils thick of 1150 equivalent weight perfluorosulfonic acid resin which has been chemically modified by ethylene diamine converting a depth of about 1.5 mils to the perfluorosulfonamide, and (c) a homogeneous film about 7 mils thick of 1150 equivalent weight perfluorosulfonic acid resin which has been chemically modified by ethylene diamine converting a depth of about 1.2 mils to the perfluorosulfonamide.

For the above-mentioned amine-substituted membranes, a laminated inert cloth supporting fabric may be employed. The thickness of the laminated inert cloth supporting fabric is in the range from about 3 to about 7 and preferably from about 4 to about 5 mils. The inert cloth supporting fabric is typically comprised of polytetrafluoroethylene, rayon, or mixtures thereof.

An example of diamine substituted polymer is a perfluorosulfonic acid polymer comprised of a homogeneous film about 7 mils thick, of about 1150 equivalent weight perfluorosulfonic acid resin which has been chemically modified on one side by ethylene diamine converting a depth of about 1.5 mils of the polymer to perfluorosulfonamide. The unmodified side is laminated to a fabric of polytetrafluoroethylene resin. The fabric is characterized by having a basic weave pattern, a thread count of about 6×6 polytetrafluoroethylene, 24×24 rayon per centimeter, a denier of about 200 polytetrafluoroethylene and 50 rayon, a fabric thickness of about 4.6 mils and an open area (Optical) of about 70% by volume after rayon removed.

The ethylene diamine treated side of the membrane is oriented toward the cathode in the electrolytic cell.

Also included in this first group of membranes are polymers similar to the above U.S. Pat. No. 4,030,988 which are prepared as described in U.S. Pat. No. 4,085,071, supra, wherein surface sulfonyl groups of the backbone sulfonated fluorine polymers are reacted to a selected depth with a primary amine such as with heat treatment of the converted polymer to form N-monosubstituted sulfonamido groups or salts on the sulfonyl fluoride sites of the copolymer through the reaction of the primary amide.

With respect to the diamine or polyamine substituted polymers of the U.S. Pat. No. 4,030,988 and the primary amine polymers of the U.S. Pat. No. 4,085,071 patent described above, the modifications are generally performed on only one side of the membrane. The thickness of the diamine and polyamine substituted polymers is in the range from about 4 to about 10 and preferably in the range from about 5 to about 9 mils. The depth of the modification is in the range from about 1.0 to about 7.0 and preferably from about 1.2 to about 1.5 mils.

The amine treated side of the membrane is also oriented toward the cathode.

The second group of materials suitable as membranes in the process of this invention includes perfluorosulfonic acid membrane laminates which are comprised of at least two unmodified homogeneous perfluorosulfonic acid films. Before lamination, both films are unmodified and are individually prepared in accordance with the basic U.S. Pat. No. 4,036,714 previously described.

The first film has a thickness in the range from about 0.5 to about 2.0 mils, of about 1500 equivalent weight perfluorosulfonic acid resin, and the second film has a thickness in the range from about 4.0 to about 6.0 mils, of about 1100 equivalent weight perfluorosulfonic acid resin.

After lamination together to form a single film, the resulting membrane is positioned in the electrolytic cell with the thinner, higher equivalent weight side of the resulting film oriented toward the catholyte chamber.

Typical laminated membranes of the second group which may be employed in the process of this invention include (a) a homogeneous film about 1 mil thick of about 1500 equivalent weight perfluorosulfonic acid resin and a homogeneous film about 5 mils thick of about 1100 equivalent weight perfluorosulfonic acid resin; (b) a homogeneous film about 1.5 mils thick of about 1500 equivalent weight perfluorosulfonic acid resin and a homogeneous film about 5 mils thick of about 1100 equivalent weight perfluorosulfonic acid resin; (c) a homogeneous film about 2 mils thick of about 1500 equivalent weight perfluorosulfonic acid resin and a homogeneous film about 4 mis thick of 1100 equivalent weight perfluorosulfonic acid resin; and (d) a homogeneous film about 1.5 mils thick of about 1500 equivalent weight perfluorosulfonic acid resin and a homogeneous film about 4 mils thick of about 1100 equivalent weight perfluorosulfonic acid resin.

For selected laminated membranes, a laminated inert cloth supporting fabric may be employed. The thickness of the laminated inert cloth supporting fabric is in the range from about 3 to about 7 and preferably from about 4 to about 5 mils. The inert supporting fabric is typically comprised of polytetrafluoroethylene, rayon, or mixtures thereof.

The third group of materials suitable as membranes in the process of this invention includes homogeneous perfluorosulfonic acid membrane laminates. These are comprised of at least two unmodified perfluorosulfonic acid films of 1200 equivalent weight laminated together with an inert cloth supporting fabric of the types described hereinabove.

Typical laminated membranes of the third group which may be employed in the process of this invention include (a) a homogeneous film about 7 mils thick laminated with a "basket weave" of polytetrafluoroethylene fabric and (b) a homogeneous film about 7 mils thick laminated with a "leno weave" with a fabric comprised of polytetrafluoroethylene fibers having rayon fibers interspersed therein.

The fourth group of membranes suitable for use as membranes in the process of this invention include carboxylic acid substituted polymers described in U.S. Pat. No. 4,065,366, issued to Oda et al on Dec. 27, 1977. The teaching of that patent is incorporated herein in its entirety by reference.

The carboxylic acid substituted polymers of U.S. Pat. No. 4,065,366, are prepared by reacting a fluorinated olefin with a comonomer having a carboxylic acid group or a functional group which can be converted to a carboxylic acid group.

The fluorinated olefin monomers and the comonomers having carboxylic acid group or a functional group which can be converted to carboxylic acid group for using the production of the copolymer for the membranes can be selected from the defined groups below.

It is preferable to use monomers for forming the units (a) and (b) in the copolymers.

 (a)

 (b)

wherein X represents —F, —Cl, —H or —CF$_3$ and X' represents —F, —Cl, —H, —CF$_3$ or CF$_3$(CF$_2$)$_m$—; m represents an integer of 1 to 5 and Y represents —A, —$\phi$—A, —P—A, —O—(CF$_2$)$_n$ (P, Q, R—A; P represents —CF$_2$)$_a$(CXX')$_b$(CF$_2$)$_c$; Q represents —CF$_2$—O—CXX')$_d$; R represents —CXX'—O—CF$_2$)$_e$; (P, Q, R) represents a discretional arrangement of at least one of P, Q and R; $\phi$ represents phenylene group; X,X' are defined above; n=0 to 1; a, b, c, d and e represent 0 to 6; A represents —COOH or a functional group which can be converted to —COOH by hydrolysis or neutralization such as —CN, —COF, —COOR$_1$, —COQM, —CONR$_2$R$_3$; R$_1$ represents a C$_{1-10}$ alkyl group; M represents an alkali metal or a quarternary ammonium group and R$_2$ and R$_3$, respectively, represent hydrogen or a C$_{1-10}$ alkyl group.

The typical groups of Y have the structure having A connected to a carbon atom which is also connected to at least one fluorine atom, and include

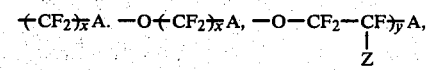

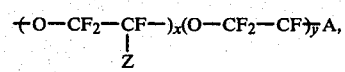

-continued

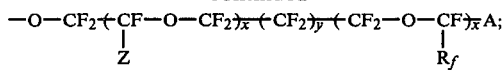

wherein x, y and z, are respectively, 1 to 10; Z and $R_f$, respectively, represent —F and a $C_{1-10}$ perfluoroalkyl group A is as defined above. In the case of the copolymers having the units (a) and (b), it is preferable to have 1 to 40, especially 30 to 20 mole percent of the unit (b) in order to produce the membrane having an ion-exchange capacity in said range. The molecular weight of the fluorinated copolymer is important because it relates to the tensile strength, the fabricapability, the water permeability and the electrical properties of the resulting fluorinated cation exchange membrane.

Typical carboxylic acid polymers include copolymer of tetrafluoroethylene and

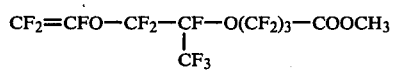

copolymerized with a catalyst of azobisisobutyronitrile in trichlorotrifluoroethane to obtain a fluorinated copolymer having an ion exchange capacity of about 1.17 meq/g polymer and a $T_g$, glass transition temperature, of 190° C. press-molded to form a film about 200 microns thick and thereafter hydrolyzed in an aqueous methanol solution of sodium hydroxide, (b) a copolymer of tetrafluoroethylene and $CF_2=CFO-(CF_2)_3-COOCH_3$ copolymerized with a catalyst of azobisisobutyronitrile to obtain a fluorinated copolymer having an ion exchange capacity of about 1.45 meq/g polymer and a $T_g$ of about 235° C., press-molded to form a film of thickness about 200 microns and hydrolyzed in an aqueous methanol solution of sodium hydroxide, (c) a copolymer of tetrafluoroethylene and

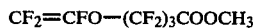 (A)

 (B)

copolymerized with a catalyst of azobisisobutyronitrile (mole ratio A/B of about 4:1) to obtain a fluorinated copolymer having an ion exchange capacity of about 1.45 meq/g polymer and $T_g$ of about 220° C., press-molded to obtain a film of about 200 microns thickness, and hydrolyzed in an aqueous methanol solution of sodium hydroxide, and (d) a copolymer of tetrafluoroethylene and $CF_2=CFO(CF_2)_3COOCH_3$ were copolymerized with a catalyst of ammonium persulfate in water to obtain a fluorinated copolymer having an ion-exchange capacity of 1.20 meq/g polymer and $T_g$ of 210° C., the copolymer extruded to obtain a film having a thickness of 250 microns and width of 15 centimeters and plied to a cloth made of a copolymer of tetrafluoroethylene and ethylene (50 mesh:thickness 150 microns), compress-molded to form a reinforced film and hydrolyzed in an aqueous methanol solution of sodium hydroxide to obtain a carboxylic acid type fluorinated cation exchange membrane. For selected membranes, a laminated inert cloth supporting fabric having a thickness from about 3 to about 7 and preferably from about 4 to about 5 mils may be employed. This is typically comprised of polytetrafluoroethylene, rayon or mixtures thereof.

The distance between an electrode, such as the anode or the cathode, to the membrane is known as the gap distance for that electrode. The gap distance of the anode to membrane and the cathode to membrane are both independently variable. Changing these respective distances concurrently or individually may affect the operational characteristics of the electrolytic cell and is reflected in the calculated current efficiency. For the process of this invention for each electrode, the electrode current efficiency is defined as the ratio of the number of chemical equivalents of product formed divided by the electrical equivalents consumed in forming that product×100. This may be expressed mathematically by the following equation (1):

$$\% \text{ Current Efficiency} = \frac{A/B}{C/D} \times 100 \quad (I)$$

where
A=Mass of product produced in grams.
B=Equivalent weight of product produced in grams per equivalent.
C=Quantity of electricity consumed in making desired product in ampere hours.
D=Faraday's Constant of 26.81 ampere hours per equivalent.

In general, anode to membrane and cathode to membrane gap distances can be defined for any concentration of mixed alkali metal chlorides employed as the anolyte in the membrane electrolytic cell. When using a purified sylvinite solution as the anolyte at a concentration in the range of from about 300 to about 400 grams per liter, the preferable anode to membrane gap distance is in the range from about 0.1 to about 2.5 centimeters, and the preferable cathode to membrane gap distance is in the range from about 0.1 to about 1.7 centimeters.

One starting material which can be used for the process of this invention is sylvinite. This is a naturally occurring ore which, while nominally of the composition KCl.NaCl, varies greatly in relative Na:K composition and can have a KCl content varying from about 15% to about 45% by weight. Because of the variability of the KCl content, it may be necessary to adjust the ratio of potassium to sodium in the brine so that the final mixed nitrate product has the desired output composition. The preferred potassium content for a brine to be utilized in the process of this invention is in the range of about 20 to about 35% by weight of the dissolved salts.

In addition to sylvinite there are a variety of salt mixtures derived from natural lake brines having potassium contents in this range which, after suitable purification, can also be used. Alternatively, a solution of carnallite ore may be used by converting the $MgCl_2$ to NaCl by the addition of an NaOH solution in sufficient quantity to convert substantially all of the $MgCl_2$ to MgO and the subsequent removal by filtration of the precipitated MgO.

Lastly, depending on the relative economics involved, a synthetic salt, made by premixing desired percentages of NaCl and KCl, can be used.

It is understood that all cell brines produced from natural sources will contain some level of impurities. In most cases, it is desirable to treat the brines so as to remove all or substantially all of these impurities before they are introduced into the electrolytic cell. This purpose may be accomplished in any convenient manner, for example, by settling or filtering out insoluble impurities such as sand, clay, etc., by treating the brine chemically to remove soluble impurities such as calcium, magnesium, aluminum and iron chlorides and sulfates, and by the addition of precipitating agents such as sodium bicarbonate, sodium hydroxide, calcium chloride, barium chloride, etc., followed by settling or filtering to remove the insoluble products formed.

U.S. Pat. No. 4,062,743 discloses general methods for starting up electrolytic cells employing alkali metal brines. In starting up an electrolytic chlor-alkali cell employing a permselective membrane selected from the types previously discussed, a mixed chloride brine solution at the desired concentration is first charged to the anolyte chamber until it is substantially full, leaving sufficient room at the top to collect and remove chlorine product. An aqueous solution of mixed alkali metal hydroxides at the desired mole percentage is then fed into the catholyte chamber until it is substantially full, leaving room at the top to collect and remove hydrogen product.

The efficiency of the cell and consequent production of chlorine and caustic increase directly as the salt concentration increases and are the highest when the molar concentration of dissolved salts in the purified brine is the highest. This acts to reduce the solubility of chlorine in the anolyte so that more and purer chlorine gas is evolved at the anode under such conditions. At a given percent salt decomposition in the cell, higher brine concentrations also result in increased output per cell. Furthermore, the conductivity of the electrolyte is greatest when the molar concentration of the dissolved salts is the highest. The greater the concentration, the more ions there are to conduct the current through the solution. Thus, in the most efficient cells, the salts will be present in the highest concentration practible.

It is also known that the solubility of alkali metal chlorides in aqueous solutions increases with an increase in temperature, with the effect being particularly notable with KCl. Thus, in the electrolysis of the mixed alkali salt brines of the present invention, it is desirable to employ a high temperature in both forming the brine and in operating the cell to take advantage of the much higher solubility of KCl which can be achieved in hot water as compared to NaCl. For the process at hand, operating temperatures in the range from about 70° to 100° C. and preferably from about about 80° to about 90° C. are employed. In the operation of the process of this invention, the inlet brine salt concentration can have a range of about 200 grams/liter to a substantially saturated solution, about 300 to 400 grams/liter being preferred.

During electrolysis, a direct current is supplied to the cell and a voltage in the range of 3.2 to 3.6 V DC is impressed across the cell terminals. To initially obtain the desired concentrations of mixed sodium and potassium hydroxides, little or no product may be withdrawn from the catholyte chamber until the desired caustic concentration is reached.

When employing a cell with a permselective membrane, as in the present invention, the sodium and potassium ions are transported across membrane 12 from anolyte compartment 14 into catholyte compartment 16 during electrolysis. The concentration of mixed hydroxides produced in the catholyte compartment 16 is essentially determined by the amount of water added to the compartment and the rate with which it is added. Additional water is obtained by direct transfer through the membrane. In a preferred embodiment, the alkali metal hydroxide level reached in the catholyte chamber will be in the range of about 300 to about 700 grams per liter of solution. When a brine comprised of mixed sodium and potassium chlorides is electrolyzed in a membrane cell of the type as hereinabove described it is found the percentage of potassium in the catholyte solution is surprisingly and unexpectedly higher than it was in the anolyte brine. Thus, to achieve a weight ratio range of sodium to potassium of from about 50:50 to about 70:30 in the final catholyte and thereafter the nitrate product, a starting brine having a sodium to potassium weight ratio of sodium to potassium in the range from about 65:35 to about 80:20, and more preferably from about 70:30 to about 75:25 can be used. Such a surprising capability allows the use of a wide variety of starting materials which include not only natural sylvinite and carnalite ores but mixed salt compositions recoverable from a number of natural brine residues found throughout the western United States. The chloride content of the catholyte is minimal and is typically in the range of about 0.1% to about 0.2% by weight.

During electrolysis, a portion of the spent brine is removed from the anolyte chamber after partial depletion. In a preferred embodiment of this invention, the percent depletion of mixed alkali metal chlorides during electrolysis will be in the range of about 5% to about 40% and preferably in the range of about 10% to about 30%. The spent brine removed from anolyte compartment 14 is normally combined with fresh feedstock to bring it back up to the desired total salt concentration and then recycled back into anolyte compartment 14 for further electrolysis. To prevent excessive buildup of contaminants, some additional purification may be required.

The operating pressure of the cell is essentially atmospheric. However, sub- or super-atmospheric pressures may be used, if desired.

Conversion of the mixed caustic catholyte to a mixed nitrate solution is performed preferably as the caustic solution is being withdrawn from the catholyte compartment by the controlled addition of a 0.1 to 16N nitric acid solution to the output stream. Such an arrangement, as shown in FIG. 1 is preferable for several reasons. First, it allows substantially normal operation of the cell as a chlor-alkali producer. Secondly, by removing the nitration step from the interior volume of the cell, it acts to prevent both overheating of the cell and accidental acidization or nitration of catholyte compartment 16. Such occurrences, if of more than transient significance, can have very serious and deleterious effects on many membranes and catalytic cathodic materials used. Thirdly, it obviates the need except for acid storage and acid inlet 38, to use special acid resistant materials of construction.

Sufficient nitric acid is added to react with all of the alkali metal hydroxide in the catholyte to form a mixed potassium nitrate-sodium nitrate reaction mass. Generally a substantially complete reaction occurs when the pH of the catholyte is reduced to the range from about 5.0 to about 7.5 and preferably from about 6.0 to about 6.5. At the preferred pH range, absorption of $CO_2$ from the atmosphere to form carbonate contaminants is substantially completely inhibited.

The reaction temperature is generally maintained at a temperature in the range from about 20° C. to about 100° C. and preferably from about 60° C. to about 85° C. The rate and manner of acid addition must be carefully controlled not only to avoid perturbing operation of the cell but also because neutralization of concentrated mixed caustic solution is highly exothermic. As a result, the already hot catholyte solution will be heated even further, possibly to above its boiling point thus significantly raising the pressure in the system unless provisions have been made either to relieve the pressure or to cool the catholyte solution during neutralization. Cooling can be done in several ways. For example, the acid can be added in dilute form to provide a greater mass to absorb the heat emitted. However, this creates a greater quantity of solution which must be processed to produce dry mixed nitrate product. Alternatively, the catholyte solution can be discharged into an external holding tank (not shown) at which point the acid is added. Such an approach is within the ambit of the process of of this invention.

The magnitude of these problems can be reduced if a heat exchanger (not shown) is used to absorb the heat of neutralization. One good candidate for the cooling fluid is the spent brine discharged from the anolyte chamber. It is a normal practice in membrane cell operation to heat this solution to drive off dissolved chlorine prior to reconstituting it as a feedstock for the anolyte chamber. Utilizing the spent brine as a heat transfer medium for the neutralized catholyte effects both removal of chlorine from the brine and cooling of the catholyte to the desired level.

Solid mixed nitrate product can be obtained by subsequent evaporation and drying the neutralized catholyte by any of a variety of well-known methods to produce dry particles of mixed sodium nitrate-potassium nitrate. The concentration of sodium nitrate ranges from about 40% to about 80%, and preferably from about 50% to about 70% by weight, the balance being substantially potassium nitrate. When the mixed nitrate product is to be used as a solar heat transfer medium, it is preferably free of fines, to avoid caking of the particles during shipment.

The examples cited are presented to define the process of this invention more fully without intending to be limited thereby. All parts and percentages are by weight unless indicated otherwise.

EXAMPLE 1

Mixed sodium and potassium hydroxide, hydrogen gas and chlorine gas were continuously prepared in a divided flow-through polytetrafluoroethylene (PTFE) cell of the type illustrated in FIG. 1, containing separate anolyte and catholyte chambers and exterior dimensions of about 23 centimeters in height, 13 centimeters in width and 9 centimeters in depth. A NAFION ® 499 permselective membrane, which is described by its manufacturer, duPont, as being a membrane with a "homogeneous film 7 mils thick of 1200 equivalent weight perfluorosulfonic acid resin laminated with T-900 fabric of TEFLON ® TFE resin ("basket weave") and rayon" was employed to separate the two chambers. Prior to installation, the membrane was conditioned by soaking it for 16 hours in a 30 percent NaOH solution at room temperature.

An anode was positioned vertically in the anolyte chamber. The anode was an approximately 7 cm by 7 cm square section of a flat metallic diamond mesh having horizontally oriented apertures 1.0 cm by 0.3 cm, said mesh being comprised of a titanium substrate coated with a mixture of ruthenium oxide and titanium oxide. The coating was obtained by painting the substrate with butyl titanate and ruthenium trichloride and then oven firing to form the oxides. The finished anode was of the type described in U.S. Pat. No. 3,624,498, supra, and was secured to one side of an approximately 1 cm diameter circular titanium rod which was centrally inserted through one side of the anolyte chamber.

A cathode was positioned in the catholyte chamber. This comprised a 7 cm by 7 cm section of flat nickel diamond wire mesh having vertically oriented aperatures 1.0 cm by 0.5 cm. This was attached to an approximately 1 cm diameter circular nickel rod which was extended into the catholyte chamber through the opposite side wall of the catholyte chamber.

When the cell was assembled, the anode and cathode were positioned parallel to each other and to the membrane at a distance of approximately 0.4 cm from the membrane.

The cell was assembled by sealing the junction of the anolyte and catholyte chambers with a suitable inert gasket and connecting the electrical leads, brine and water feeds, chlorine and hydrogen outlets and the anolyte and catholyte overflows. The anode chamber was filled with approximately 230 milliliters of a brine solution comprising 134.9 grams per liter NaCl (44%) and 170 grams per liter KCl (56%) having a pH of about 8.7. The catholyte chamber was filled with about 230 milliliters of 20 percent NaOH solution. The cell heaters were turned on and when a temperature of approximately 60° C. was reached inside the cell, the cell current was turned on at approximately 0.5 amperes. The current was increased at a rate of 1.5 A/3 minutes as the cell continued to heat up. The brine and water feed pumps were turned on when the current level reached 3.5 amperes and the current was gradually increased until a final cell current of 10.5 amperes (2.14 KA/M$^2$) was obtained. The water flow rate into the cathode chamber was 9.5 ml/minute and the brine flow rate to the anode chamber was 13 ml/minute. When the current reached the final value of 10.5 amperes, the water flow rate was increased to 1.2 milliliters/minute at which value the cell was operated for 4.5 hours at 10.5 amperes and 85° C. The cell voltage during the run ranged from 3.5 to 3.6 volts and the pH of the depleted brine was 5.74. Power consumption was about 2000 kilowatt-hours/time and the current efficiency was about 98%.

No attempt was made to neutralize the caustic produced during this run and the results obtained are shown in Table I below.

TABLE I

| | | g/l K | | g/l Na | |
|---|---|---|---|---|---|
| (1) | Brine feed to anolyte | 93 | (49%) | 94 | (51%) |
| (2) | Initial caustic | 0.288 | (25%) | 0.856 | (75%) |
| (3) | Caustic removed during middle of run | 0.471 | (45.5%) | 0.563 | (54.5%) |
| (4) | Caustic removed at end of run | 0.650 | (59.5%) | 0.460 | (40.5%) |

It will be noted that the potassium to sodium ratio in the catholyte chamber unexpectedly changed continuously during the run from a value of about 1:3 at the beginning to 1.5:1 at the end. It appeared that this was reflection both of the gradual removal and replacement of the 20% NaOH solution initially charged into the catholyte chamber and possibly an increased mobility of potassium ions relative to sodium ions through the membrane during electrolysis. Thus, at the conclusion of the run, the potassium/sodium ratio had reached the 1.5:1 value as compared to the value of about 1:1 in the brine.

The discharged mixed caustic solution was combined with that produced in Example 2 for further processing.

EXAMPLE 2

The cathode chamber of the cell of Example 1 was filled with some of the mixed sodium/potassium hydroxide solution collected during the test run of Example 1. The mixed brine solution was fed to the cell at a rate of 8 ml/minute while the temperature of the cell was raised to 66° C. and 0.5 amperes placed across the cell. The current was increased at the rate of 1.5 A/3 min. while the cell temperature was increased to 85°. As in Example 1 while at 3.5 amperes, deionized water feed into the catholyte chamber was started at 1.2 ml/min. When the cell reached its operating level of 10.5 amperes and 85° C., it was run for 25 hours. The cell voltage range from 3.5 to 3.6 volts. Results of this run are summarized in Table II.

TABLE II

| | | g/l K | | g/l Na | |
|---|---|---|---|---|---|
| (1) | Initial caustic | 0.675 | (59%) | 0.460 | (41%) |
| (2) | Caustic collected late in the run | 0.655 | (67%) | 0.309 | (33%) |
| (3) | Caustic removed at end of run | 0.540 | (69%) | 0.249 | (31%) |

Approximately 2.25 liters of caustic solution was collected during these two runs. The total concentration of mixed alkali caustic was 12.82%.

It will be noted that the trend toward enrichment of potassium relative to sodium observed during the previous example continued during this run so that the final potassium/sodium weight ratio was 2.3:1.

The caustic was stored for 3 to 4 days at room temperature at which time it was reacted with nitric acid. For the solutions produced, it required approximately 0.5 liters of 16N $HNO_3$ to neutralize the mixed caustic product to a pH of 7.2. The (K/Na)$NO_3$ solution was then evaporated over a period of 6–7 hours to reduce its volume to 0.5 liters. On cooling, a white crystalline product was precipitated and collected from this solution. Since the final product appeared to be hygroscopic, the crystals were placed in an oven for 30 minutes at a temperature of 150° to 160°. The total weight of (K/Na)$NO_3$ was 507 grams having a K/Na ratio of about 2:1 and an overall purity of in excess of 98%.

EXAMPLE 3

To further demonstrate the potassium enrichment phenomenon, the membrane in a cell similar to that used in Examples 1 and 2 was replaced with one made from a perfluorocarboxylic acid resin. Using a startup procedure similar to that described in Example 2 the cell was operated continuously for 149 days during which time brine having several different K:Na ratios were used as the anolyte solution. For the first 90 days of operation the daily anolyte K:Na ratio ranged from about 0.62 to 0.92 with the catholyte solution being held at 30–35% total alkali metal hydroxide level and having a K:Na ratio ranging from about 0.97 to 1.4. At this time, over a period of about 5 days, the anolyte K:Na ratio was then reduced to a range of about 0.25 (20 wt. %) to about 0.4 (35 wt. %). At these levels the catholyte K:Na ratio rose to the range of about 0.4 (30 wt. %) to 0.7 (43 wt. %).

Throughout this run the current efficiency ranged between 98 and 100% while the cell voltage averaged between about 3.4 and 3.7. The power consumption ranged between about 1900 and 2100 KWH/Tonne with the average being about 2000.

EXAMPLE 4

The cathode of the cell of Example 3 was replaced by one having a Raney nickel-15 wt % molybdenum surface of the type described in U.S. Pat. No. 4,240,895 and operated as described in Example 3. After 59 days of operation the operating voltage was in the range of about 3.0 to 3.3 and the current efficiency was about 98.8% resulting in a power consumption in the range of 1700 and 2000 KWH/Tonne with the average being about 1800.

It will be understood that the above description of the present invention is susceptible to various modifications, changes, and adaptations, and the same are intended to be comprehended within the meaning and range of equivalents of the appended claims.

What is claimed is:

1. A process for producing a mixture consisting essentially of sodium nitrate and potassium nitrate, which comprises:
   (a) feeding a brine comprised of a mixture of sodium chloride and potassium chloride to the anolyte compartment of an electrolytic cell having an anolyte compartment and a catholyte compartment sealingly separated by a permselective cation exchange hydraulically impermeable membrane;
   (b) electrolyzing said brine to produce a catholyte solution comprised of a mixture of sodium hydroxide and potassium hydroxide, said catholyte solution being substantially free of chloride ions;
   (c) withdrawing said catholyte solution from said catholyte compartment; and
   (d) reacting said catholyte solution with nitric acid to produce a mixture of sodium nitrate and potassium nitrate therefrom.

2. The process of claim 1 wherein sufficient nitric acid is reacted with said catholyte to adjust the pH to within the range from about 5.0 to about 7.5.

3. The process of claim 2 wherein sufficient nitric acid is reacted with said catholyte to adjust the pH to within the range from about 6.0 to about 6.5.

4. A process for producing a mixture consisting essentially of sodium and potassium hydroxides which comprises:
   (a) feeding a brine comprised of a mixture of sodium chloride and potassium chloride to the anolyte compartment of an electrolytic cell having an anolyte compartment and a catholyte compartment sealingly separated by a permselective, cation exchange hydraulically impermeable membrane, and
   (b) electrolyzing said brine to produce a catholyte solution comprised of a mixture of sodium hydroxide and a potassium hydroxide, said catholyte solution being substantially free of chloride ions.

5. The process of claims 1 or 4 wherein said electrolysis is performed in a cell temperature range from about 70° to about 100° C.

6. The process of claim 5 wherein said electrolysis cell temperature is between about 80° and about 90° C.

7. The process of claims 1 or 4 wherein the total concentration of said dissolved sodium chloride and potassium chloride in said brine is in the range from about 200 grams/liter to a substantially saturated solution.

8. The process of claim 7 wherein said concentration is in the range of from about 300 to about 400 grams/liter.

9. The process of claim 7 wherein the potassium chloride in said brine is in the range from about 15% to about 45% by weight of the salts dissolved in said brine.

10. The process of claim 9 wherein the range of potassium chloride in said brine is from about 20% to 35% by weight of the salts dissolved in said brine.

11. The process of claim 10 wherein the range of potassium chloride in said brine is from about 25% to 30% by weight of the salts dissolved in said brine.

12. The process of claim 9 wherein said mixture of sodium chloride and potassium chloride dissolved in said brine is derived from sylrunite.

13. The process of claim 9 wherein said brine is prepared by dissolving carnallite in aqueous sodium hydroxide so as to precipitate substantially all of the magnesium as magnesium hydroxide, followed by removal of the magnesium hydroxide.

14. The process of claims 1 or 4 wherein said catholyte solution has a concentration of between about 300 to about 700 grams per liter of sodium hydroxide and potassium hydroxide.

15. The process of claim 14 wherein the composition of said catholyte solution comprises between about 40% and 80% by weight sodium hydroxide with the balance being potassium hydroxide.

16. The process of claim 15 wherein the composition of said catholyte solution comprises between about 50% and 70% by weight sodium hydroxide with the balance being potassium hydroxide.

17. The process of claims 1 or 4 wherein the salt concentration of said anolyte brine is depleted by about 5% to about 40% by weight during electrolysis.

18. The process of claim 17 wherein said salt concentration is depleted by about 20% to about 30% by weight during electrolysis.

19. The process of claims 1 or 4 wherein said membrane is selected from a class comprising amine substituted polymers, unmodified perfluorosulfonic acid laminates, homogeneous perfluorosulfonic acid laminates and carboxylic acid substituted polymers.

20. The process of claim 19 wherein said membrane is diamine substituted perfluorosulfonic acid resin, modified on one side by amine to a depth of about 0.5 mils.

21. The process of claim 20 wherein said membrane is a diamine substituted membrane comprised of a homogeneous film about 7 mils thick, of about 1150 equivalent weight perfluorosulfonic acid resin which has been chemically modified on one side by ethylene diamine converting a depth of about 1.5 mils of the polymer to perfluorosulfonamide and with the unmodified side being laminated to a fabric of polytetrafluoroethylene.

22. The process of claim 21 wherein said fabric is characterized by having a basic weave pattern, a thread count of about 6×6 polytetrafluoroethylene, 24×24 rayon per centimeter, a denier of about 200 polytetrafluoroethylene and 50 rayon, a fabric thickness of about 4.6 mils and an open area (Optical) of about 70 percent by volume after the rayon is removed.

23. The process of claim 22 wherein said diamine substituted membrane is a perfluorosulfonic acid polymer comprised of a homogeneous film about 7 mils thick, of about 1200 equivalent weight perfluorosulfonic acid resin which has been chemically modified on one side by ethylene diamine converting a depth of about 1.5 mils of the polymer to perfluorosulfonamide.

24. The process of claim 23 wherein said diamine substituted membrane is a perfluorosulfonic acid polymer comprised of a homogeneous film about 7 mils thick, of about 1150 equivalent weight perfluorosulfonic acid resin which has been chemically modified on one side by ethylene diamine converting a depth of about 1.2 mils of the polymer to perfluorosulfonamide.

25. The process of claim 19 wherein said membrane is an amine substituted membrane, said membrane being laminated to a fabric of polytetrafluoroethylene and rayon.

26. The process of claim 25 wherein said amine substituted membrane is a primary amine substituted membrane.

27. The process of claim 26 wherein said amine substituted membrane is a diamine substituted membrane.

28. The process of claim 27 wherein said amine substituted membrane is a polyamine substituted membrane.

29. The process of claim 28 wherein said polyamine is comprised of at least two amino groups with one primary amino group and the second amino group either primary or secondary.

30. The process of claim 29 wherein said amine substituted membrane is prepared by reacting said amine with a precursor sulfonyl fluoride polymer wherein pendant sulfonyl fluoride groups react to form N-monosubstituted sulfonamido groups or salts thereof.

31. The process of claim 30 wherein the thickness of said amine substituted membrane is in the range from about 4 to about 10 mils.

32. The process of claim 31 wherein the thickness of said amine substituted membrane is in the range from about 5 to about 9 mils.

33. The process of claim 32 wherein said amine is reacted with said precursor sulfonyl fluoride polymer to a depth in the range from about 0.5 to about 7 mils.

34. The process of claim 33 wherein said amine is reacted with said precursor sulfonyl fluoride polymer to a depth in the range from about 1 to about 2 mils.

35. The process of claim 34 wherein said amine is ethylene diamine.

36. The process of claim 19 wherein said membrane comprises two unmodified homogeneous perfluorosulfonic acid films, said films being laminated together with a fabric of tetrafluoroethylene and rayon.

37. The process of claim 36 wherein said laminate of perfluorosulfonic acid membrane is comprised of a first membrane having a thickness in the range from about 1 to about 2 mils, of about 1500 equivalent weight perfluorosulfonic acid resin, and a second membrane having a thickness in the range from about 4 to about 5 mils of about 1100 equivalent weight perfluorosulfonic acid resin.

38. The process of claim 37 wherein said laminate of perfluorosulfonic acid membrane is comprised of a first membrane having a thickness of about 2 mils of about 1500 equivalent weight perfluorosulfonic acid resin and a second membrane having a thickness of about 4 mils of about 1100 equivalent weight perfluorosulfonic acid resin.

39. The process of claim 38 wherein said laminate of perfluorosulfonic acid membrane is comprised of a first membrane having a thickness of about 1 mil of about 1500 equivalent weight perfluorosulfonic acid resin and a second membrane having a thickness of about 5 mils of about 1100 equivalent weight perfluorosulfonic acid resin.

40. The process of claim 39 wherein said laminate of perfluorosulfonic acid membrane is comprised of a first membrane having a thickness of about 1.5 mils of about 1500 equivalent weight perfluorosulfonic acid resin and a second membrane having a thickness of about 5 mils of about 1100 equivalent weight perfluorosulfonic acid resin.

41. The process of claim 19 wherein said membrane comprises at least two unmodified perfluorosulfonic acid films of about 1200 equivalent weight laminated together with an inert cloth supporting fabric.

42. The process of claim 41 wherein said membrane is a homogeneous film of about 7 mils thickness and said inert cloth comprises a polytetrafluoroethylene basket weave.

43. The process of claim 19 wherein said membrane comprises a carboxylic acid substituted polymer prepared by reacting a fluorinated olefin with a comonomer having a functional group selected from the group consisting of carboxylic acid and a functional group which can be converted to carboxylic acid.

44. The process of claim 43 wherein said carboxylic acid substituted polymer is a copolymer of tetrafluoroethylene and

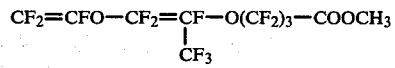

copolymerized with a catalyst of azobisisobutyronitrile in trichlorotrifluoroethane to obtain a fluorinated copolymer having an ion exchange capacity of about 1.17 meq/g polymer and a $T_g$ of 190° C. press molded to form a film about 200 microns thick thereafter hydrolyzed in an aqueous methanol solution of sodium hydroxide.

45. The process of claim 44 wherein said carboxylic acid substituted polymer is a copolymer of tetrafluoroethylene and $CF_2=CFO-(CF_2)_3-COOCH_3$ copolymerized with a catalyst of azobisisobutyronitrile to obtain a fluorinated copolymer having an ion exchange capacity of about 1.45 meq/g polymer and a $T_g$ of about 235° C., press molded to form a film of thickness about 200 microns, hydrolyzed in an aqueous methanol solution of sodium hydroxide.

46. The process of claim 45 wherein said carboxylic acid substituted polymer is a copolymer of tetrafluoroethylene and $CF_2=CFO-(CF_2)_3-COOCH_3(A)$ and $CF_2=CFOCF_2CF(CF_3)O(CF_2)_3COOCH_4(B)$ copolymerized with a catalyst of azobisisobutyronitrile (mole ratios A/B of about 4:1) to obtain a fluorinated copolymer having an ion exchange capacity of about 1:45 meq/g polymer and $T_g$ of about 220° C., press molded to obtain a film of about 200 microns thickness, and hydrolyzed in an aqueous solution of methanol of sodium hydroxide.

47. The process of claim 46 wherein said carboxylic acid substituted polymer is a copolymer of tetrafluoroethylene and $CF_2=CFO(CF_2)_3-COOCH_3$ with a catalyst of ammonium persulfate in water to obtain a fluorinated copolymer having an ion-exchange capacity of 1.20 meq/g polymer and Tg of 210° C., said copolymer being extruded to obtain a film having a thickness of 250 microns and width of 15 cm., and plied to a cloth made of copolymer of tetrafluoroethylene and ethylene (50 mesh: thickness 150 microns) compress-molded to form a reinforced film and hydrolyzed in an aqueous methanol solution of sodium hydroxide to obtain a carboxylic acid type fluorinated cation exchange membrane.

48. The process of claim 41 wherein said membrane is a homogeneous film of about 7 mils thick laminated with a leno weave with a fabric comprised of polytetrafluoroethylene fibers having rayon fibers interspersed therein.

* * * * *